United States Patent
Simpson et al.

(10) Patent No.: US 7,438,839 B2
(45) Date of Patent: Oct. 21, 2008

(54) FORMULATION FOR THE MANUFACTURE OF CARBON-CARBON COMPOSITE MATERIALS

(75) Inventors: Allen H. Simpson, Buchanan, MI (US); Slawomir T. Fryska, Granger, IN (US); Mark L. La Forest, Granger, IN (US); Barry P. Soos, Mishawaka, IN (US)

(73) Assignee: Honeywell International Inc., Morris Township, NJ (US)

( * ) Notice: Subject to any disclaimer, the term of this patent is extended or adjusted under 35 U.S.C. 154(b) by 790 days.

(21) Appl. No.: 10/956,582

(22) Filed: Oct. 1, 2004

(65) Prior Publication Data

US 2006/0073338 A1   Apr. 6, 2006

(51) Int. Cl.
*B29C 43/02* (2006.01)
(52) U.S. Cl. ............... 264/29.2; 264/29.1; 264/240; 264/241; 428/408; 423/447.2
(58) Field of Classification Search ............. 428/408; 264/29.1, 29.2, 240, 241; 162/145, 152; 423/445 R, 447.1, 447.2, 447.4
See application file for complete search history.

(56) References Cited

U.S. PATENT DOCUMENTS

| | | | | |
|---|---|---|---|---|
| 4,041,116 A | * | 8/1977 | Baud et al. | 264/29.5 |
| 4,451,590 A | * | 5/1984 | Fujimaki et al. | 514/419 |
| 4,687,607 A | * | 8/1987 | Shigeta et al. | 264/29.5 |
| 4,959,139 A | | 9/1990 | Blakeburn et al. | |
| 5,395,864 A | | 3/1995 | Miyoshi et al. | |
| 5,468,357 A | | 11/1995 | Upadhya et al. | |
| 5,776,633 A | * | 7/1998 | Mrotek et al. | 429/231.8 |
| 5,989,390 A | | 11/1999 | Lee | |
| 6,093,482 A | * | 7/2000 | Park et al. | 428/293.4 |
| 6,129,868 A | * | 10/2000 | Penkov et al. | 264/29.7 |
| 6,699,427 B2 | * | 3/2004 | Huang et al. | 264/434 |
| 6,749,937 B2 | * | 6/2004 | Gray | 428/408 |
| 6,878,331 B2 | * | 4/2005 | Huang et al. | 264/434 |
| 7,207,424 B2 | * | 4/2007 | Huang et al. | 188/251 A |
| 2002/0170787 A1 | | 11/2002 | James et al. | |
| 2004/0074075 A1 | | 4/2004 | James et al. | |
| 2005/0179152 A1 | | 8/2005 | Bauer et al. | |
| 2006/0247121 A1 | * | 11/2006 | Shim | 502/60 |

FOREIGN PATENT DOCUMENTS

EP   1 323 685 A2   7/2003
WO   WO-2005/102962 A1   11/2005

* cited by examiner

*Primary Examiner*—Eric Hug
(74) *Attorney, Agent, or Firm*—Birch, Stewart, Kolasch & Birch, LLP

(57) ABSTRACT

Method for manufacturing a carbonized carbon-carbon composite preform, by: mixing (a) chopped carbon fiber, chopped stabilized pitch fiber, or chopped oxidized polyacrylonitrile (PAN) fiber, (b) thermoplastic pitch binder powder, and (c) activated carbon powder to form a mixture of 15-60 parts by weight of chopped carbon fiber or chopped stabilized pitch fiber or chopped oxidized PAN, 28-83 parts by weight of thermoplastic pitch binder powder, and 1-12 parts by weight of activated carbon powder; depositing this mixture into a mold; pressing/heating the materials in the mold to form a preform by compaction; removing the compacted preform from the mold; and carbonizing the compacted preform. The preform is preferably configured in the form of an aircraft landing system brake disc.

12 Claims, 1 Drawing Sheet

FORMULATION FOR THE MANUFACTURE OF CARBON-CARBON COMPOSITE MATERIALS

FIELD OF THE INVENTION

This invention relates to carbon-carbon composite materials such as those used to make friction components. A particularly preferred embodiment of this invention is an aircraft landing system brake disc made from the improved carbon-carbon composite formulation described herein.

BACKGROUND OF THE INVENTION

Carbon-carbon composite materials may be made from fibrous materials such as carbon fibers or carbon fiber precursors. In the course of manufacturing the carbon-carbon composites, these fibrous materials are generally mixed with binders. One type of such carbon-carbon composites is made with chopped fibers mixed with pitch-based thermoplastic binder in powder form. The mixture is placed in a mold where it is compacted and heated to form a preform, and the resulting preform is carbonized by heating it. However, pitch-based thermoplastic binders tend to become liquid and to foam as the temperature increases during carbonization. This liquid phase pitch may run out of the preform during the carbonization process. In order to avoid foaming and run out, the preform is conventionally subjected to a lengthy oxidative stabilization process prior to carbonization.

SUMMARY OF THE INVENTION

It has been found that incorporating from 1 to 12 weight-% activated carbon powder into the preform mixture prior to preform formation (compaction) can reduce or eliminate foaming problems in subsequent carbonization processing. This enables manufacturers to omit oxidative stabilization of the preform mixture in the compaction mold and enables more rapid subsequent carbonization of the preform.

One embodiment of the present invention is a composition suitable for manufacturing a carbon-carbon composite preform. This composition entails a mixture of carbon fiber or carbon fiber precursor. Carbon fiber precursors include stabilized pitch fibers and oxidized polyacrylonitrile (PAN) fibers. During a charring operation, the carbon fiber precursors are converted into carbon fibers. The present invention contemplates that 15-60 parts by weight of chopped carbon fiber or chopped carbon fiber precursor are mixed with 28-83 parts by weight of thermoplastic pitch binder powder and 1-12 parts by weight of activated carbon powder. Preferably, 45-55 parts by weight of chopped carbon fiber or carbon fiber precursor are mixed with 40-50 parts by weight of pitch binder powder and 2.5-7.5 parts by weight of activated carbon. A particularly preferred embodiment mixes 50 weight-% chopped carbon fiber, 45 weight-% thermoplastic pitch binder powder, and 5 weight-% activated carbon powder.

Another embodiment of this invention is a compacted carbon-carbon composite preform comprising a molded mixture, wherein the mixtures that may be molded are those described above. In the compacted preform, at least 2 weight-% of said thermoplastic binder is adsorbed to said activated carbon. Most preferably, the preform of this invention is configured as a brake disc for an aircraft landing system.

The present invention also contemplates a method for carbonizing a preform. In a first step, this method mixes: (a) chopped carbon fiber, chopped stabilized pitch fiber, or chopped oxidized PAN fiber; (b) thermoplastic pitch binder powder; and (c) activated carbon powder, to form a mixture of 15-60 parts by weight of chopped carbon fiber or chopped stabilized pitch fiber or chopped oxidized PAN, 28-83 parts by weight of thermoplastic pitch binder powder, and 1-12 parts by weight of activated carbon powder. The mixture is deposited into a mold, where it is pressed and heated to form a preform by compaction. The compression molding parameters are not critical to the present invention. The pressing/heating step may be conducted, for instance, at temperatures in the range 180-300° C. and at pressures in the range 1600-2400 psi. Finally, the compacted preform is removed from the mold and carbonized by generally conventional means. Again, the carbonization parameters are not critical. Carbonization may be carried out, e.g., in an inert atmosphere at a temperature of from 750 to 1200° C. for from ½ to 2 hours. Carbonized preforms prepared by the method of the present invention typically weigh at least 3% more than do carbonized preforms made by otherwise identical processes in which the activated carbon powder is replaced by thermoplastic pitch binder powder. In follow-on processing, the carbonized preform of this invention may be densified by conventional means, such as CVI/CVD processing. Where the preform is configured as a brake disc, it may subsequently be used as a component in a braking system, e.g., in an aircraft landing system.

BRIEF DESCRIPTION OF THE DRAWINGS

The present invention will become more fully understood from the detailed description given hereinafter and the accompanying drawings that are given by way of illustration only, and thus do not limit the present invention.

DETAILED DESCRIPTION OF THE INVENTION

Figure 1A:
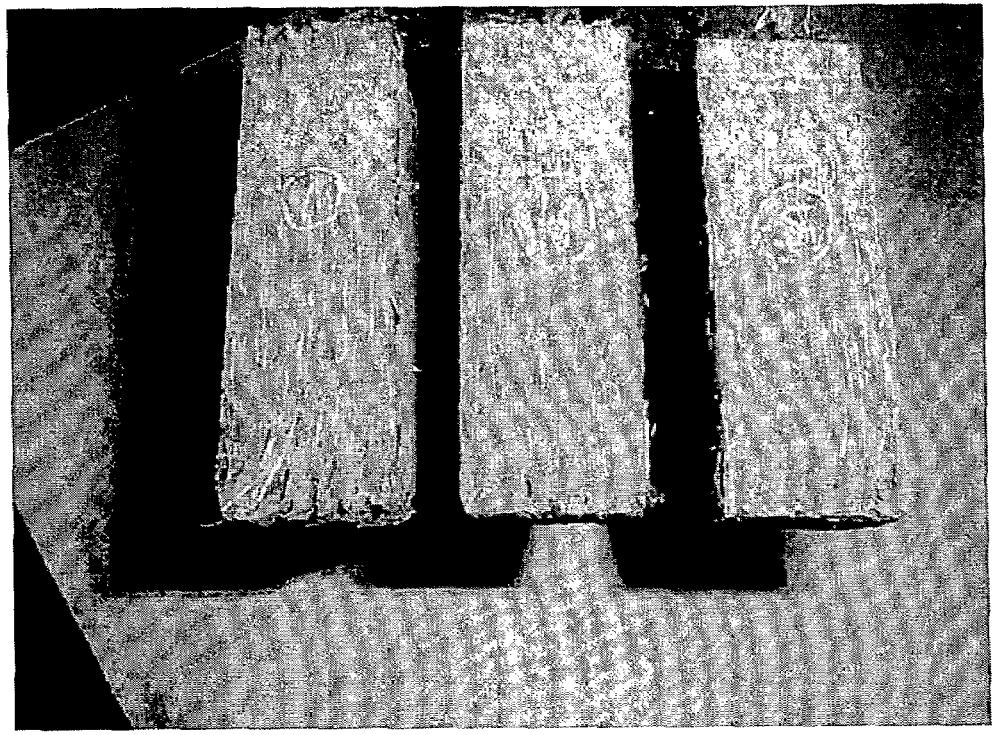
FIG. 1A is a photograph showing exposed interior cross-sections of two discs of the present invention and one disc that was prepared for comparative purposes.

PROCESSING. Chopped oxidized PAN fibers are placed in a mixing vessel. Alternatively, one may place chopped carbon fibers or chopped stabilized pitch fibers in the mixing vessel. Powdered pitch-based thermoplastic binder is also placed in the mixing vessel. In accordance with the present invention, activated carbon is substituted for a portion of the thermoplastic binder that is mixed with the chopped fibers. The two ingredients (fibers and binder powder) are mixed thoroughly, and then decanted into a mold, e.g., an annular brake disc mold. In the mold, the mixture is simultaneously pressed and heated, in order to adsorb the more mobile (e.g., lower molecular weight) fraction of the binder to the activated carbon. Typically, at least 2 weight-% of the binder employed will be adsorbed to the activated carbon. After thermal compaction in this manner, the preform is cooled and removed from the press. The compacted preform is then subjected to conventional carbonization procedures.

EXAMPLES

Example 1

50 parts by weight of chopped carbon fibers were placed in a mixing vessel. Separately, 45 parts by weight, based on the weight of the fibers, of Kopper's pitch (melting point 180° C.) in powder form was mixed with 5 parts by weight, based on the weight of the fibers, of activated carbon, and the pitch/activated carbon binder mixture was added to the mixing vessel containing the fibers. The fibers and binder mixture were mixed thoroughly, providing a random fiber orientation, and then molded into the shape of an annular brake disc preform having an outside diameter of 20 inches, an inner diameter of 10 inches, and a thickness of 2.5 inches. Molding was conducted at a pressure that reached 2000 psi and a temperature that reached 240° C. After molding, the preform was removed from the mold and placed in a fixture that masked its top and bottom faces. This mask fixture is described in detail in U.S. patent application Ser. No. 10/942,222, filed Sep. 16, 2004. In the mask fixture, the preform was heated at ambient pressure in a non-reactive nitrogen atmosphere to a temperature of 900° C. and maintained at that temperature for 1 hour, in order to carbonize the pitch binder making up the preform.

Example 2

50 parts by weight of chopped carbon fibers were placed in a mixing vessel. Separately, 47.5 parts by weight, based on the weight of the fibers, of Kopper's pitch (melting point 180° C.) in powder form was mixed with 2.5 parts by weight, based on the weight of the fibers, of activated carbon, and the pitch/activated carbon binder mixture was added to the mixing vessel containing the fibers. The fibers and binder mixture were mixed thoroughly, providing a random fiber orientation, and then molded into the shape of an annular brake disc preform having an outside diameter of 20 inches, an inner diameter of 10 inches, and a thickness of 2.5 inches. Molding was conducted at a pressure that reached 2000 psi and a temperature that reached 240° C. After molding, the preform was removed from the mold and placed in a fixture that masked its top and bottom faces. This mask fixture is described in detail in U.S. patent application Ser. No. 10/942,222, filed Sep. 16, 2004. In the mask fixture, the preform was heated at ambient pressure in a non-reactive nitrogen atmosphere to a temperature of 900° C. and maintained at that temperature for 1 hour, in order to carbonize the pitch binder making up the preform.

Comparative Example 50 parts by weight of chopped carbon fibers were placed in a mixing vessel. Separately, 50 parts by weight, based on the weight of the fibers, of Kopper's pitch (melting point 180° C.) in powder form was added to the mixing vessel containing the fibers. The fibers and binder mixture were mixed thoroughly, providing a random fiber orientation, and then molded into the shape of an annular brake disc preform having an outside diameter of 20 inches, an inner diameter of 10 inches, and a thickness of 2.5 inches. Molding was conducted at a pressure that reached 2000 psi and a temperature that reached 240° C. After molding, the preform was removed from the mold and placed in a fixture that masked its top and bottom faces. This mask fixture is described in detail in U.S. patent application Ser. No. 10/942,222, filed Sep. 16, 2004. In the mask fixture, the preform was heated at ambient pressure in a non-reactive nitrogen atmosphere to a temperature of 900° C. and maintained at that temperature for 1 hour, in order to carbonize the pitch binder making up the preform.

RESULTS

Figure 1B:
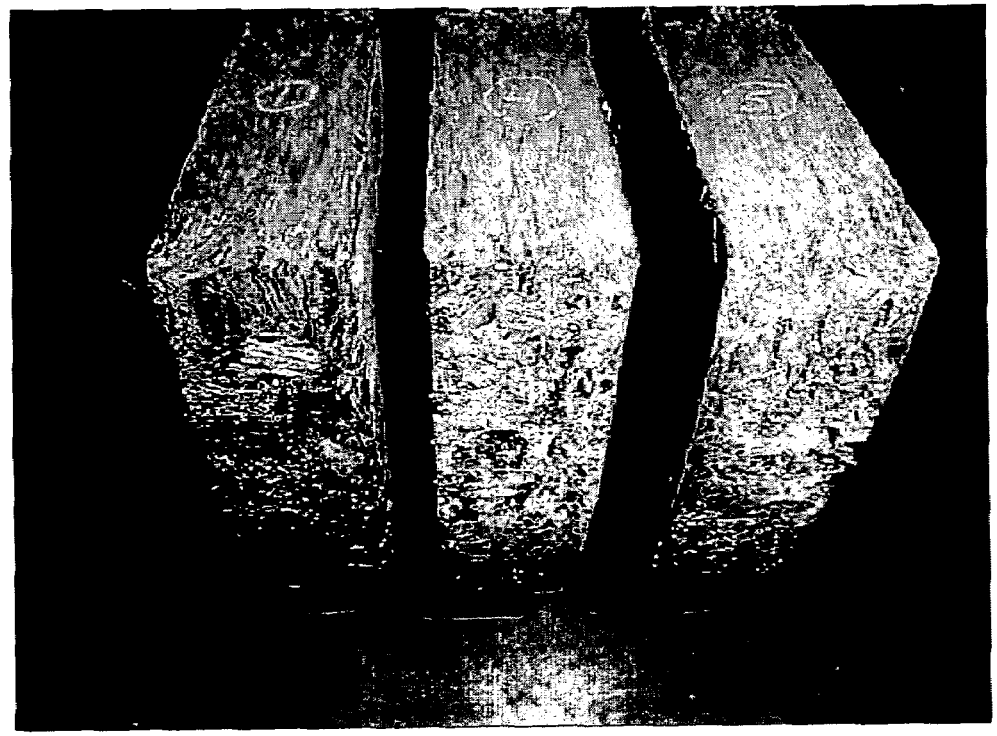
FIG. 1B is a photographic perspective view of the three disc cross-sections shown in FIG. 1A.

The carbon-carbon composite brake disc preforms prepared in Examples 1 and 2 and in the Comparative Example were cut in half along their diameters, exposing cross-sections of the materials at the interior of the discs. FIGS. 1A and 1B are photographs of the sectionalized discs. FIG. 1A looks directly down onto the exposed interiors of the discs. FIG. 1B is a perspective view, showing the exposed interiors of the discs and the outer edges of the discs. The disc made in the Comparative Example is numbered "1" in the photographs. The disc made in Example 1 is numbered 5 in the photographs. The disc made in Example 2 is numbered 4 in the photographs. During the carbonization step, run out tends to occur. Visual inspection of disc No. 1 shows pronounced run out at its outer edge. Discs Nos. 4 and 5 are almost free of run out at their outer edges. The disc preforms were weighed before and after carbonization. The starting and ending weights, and % yields, are shown in Table 1:

TABLE 1

| Disc | Start weight | Charred weight | Yield |
| --- | --- | --- | --- |
| 1 (Comparative) | 7130 | 6068 | 85.1% |
| 4 (Example 2) | 7060 | 6327 | 89.6% |
| 5 (Example 1) | 7005 | 6403 | 91.4% |

The present invention provides carbon-carbon composite brake disc preforms that have far less voids than do discs made by otherwise similar processes but without the use of activated carbon. This invention enables preforms made in accordance with the present invention to reach the desired density with fewer subsequent densification cycles, resulting in a significant improvement in the economics of brake disc manufacturing.

What is claimed is:

1. A method for manufacturing a carbonized carbon-carbon composite preform, comprising the steps of:
    (i) mixing (a) chopped carbon fiber, chopped stabilized pitch fiber, or chopped oxidized polyacrylonitrile (PAN) fiber, (b) thermoplastic pitch binder powder, and (c) activated carbon powder to form a mixture of 15-60 parts by weight of chopped carbon fiber or chopped stabilized pitch fiber or chopped oxidized PAN, 28-83 parts by weight of thermoplastic pitch binder powder, and 1-12 parts by weight of activated carbon powder;
    (ii) depositing said mixture into a mold;
    (iii) compression molding the materials in the mold at a temperature of from 180 to 300° C. and at a pressure of from 1600 to 2400 psi to form a preform by compaction;
    (iv) removing the compacted preform from the mold; and
    (v) carbonizing the compacted preform.

2. The method of claim 1, wherein the carbonized preform weighs at least 3% more than does a carbonized preform made by an otherwise identical process in which said activated carbon powder is replaced by thermoplastic binder powder.

3. The method of claim 1, wherein carbonization step (v) is conducted in an inert atmosphere at a temperature of from 750 to 1200° C. for from ½ to 2 hours.

4. The method of claim 1, which comprises the further step (vi) of densifying the carbonized preform by CVI/CVD processing.

5. An aircraft landing system brake disc made by the method of claim 4.

6. A composition suitable for manufacturing a carbon-carbon composite preform, said comprising a mixture of: (a) 15-60 parts by weight of chopped carbon fiber or carbon fiber precursor, (b) 28-83 parts by weight of thermoplastic pitch binder powder, and 1-12 parts by weight of (c) activated carbon powder.

7. The composition of claim 6, comprising 50 weight-% chopped carbon fiber, 45 weight-% thermoplastic pitch binder powder, and 5 weight-% activated carbon powder.

8. A compacted carbon-carbon composite preform comprising a molded mixture of: (a) 15-60 weight-% chopped carbon fiber or chopped stabilized pitch fiber or chopped oxidized PAN fiber, (b) 28-83 weight-% thermoplastic pitch binder powder, and (c) 1-12 weight-% activated carbon powder, wherein at least 2 weight-% of said thermoplastic binder is adsorbed to said activated carbon.

9. A carbonized carbon-carbon composite preform comprising a compacted, molded mixture of: (a) 15-60 weight-% carbon fiber or carbonized stabilized pitch fiber or carbonized oxidized PAN fiber, (b) 28-83 weight-% carbonized pitch powder, and (c) 1-12 weight-% activated carbon.

10. The carbonized carbon-carbon composite preform of claim 9, said preform being configured as a brake disc for an aircraft landing system.

11. The carbonized carbon-carbon composite preform of claim 9, comprising 50 weight-% carbon fiber, 45 weight-% carbonized pitch, and 5 weight-% activated carbon.

12. The carbonized carbon-carbon composite preform of claim 11, said preform being configured in the form of an annular ring having the shape of a brake disc for an aircraft landing system, said annular ring having an outside diameter of 20 inches, an inner diameter of 10 inches, and a thickness of 2.5 inches.

* * * * *